US012794683B2

(12) United States Patent
DiAdamo et al.

(10) Patent No.: US 12,794,683 B2
(45) Date of Patent: Nov. 10, 2026

(54) QUANTUM KEY DISTRIBUTION OVER A NETWORK USING SECURE ENCLAVES

(71) Applicant: Cisco Technology, Inc., San Jose, CA (US)

(72) Inventors: Stephen DiAdamo, Munich (DE); Charles E. Fleming, Oxford, MS (US); Ramana Rao V R Kompella, Foster City, CA (US); Miralem Mehic, Sarajevo (BA)

(73) Assignee: CISCO TECHNOLOGY, INC., San Jose, CA (US)

( * ) Notice: Subject to any disclaimer, the term of this patent is extended or adjusted under 35 U.S.C. 154(b) by 155 days.

(21) Appl. No.: 18/798,065

(22) Filed: Aug. 8, 2024

(65) Prior Publication Data

US 2026/0046119 A1 Feb. 12, 2026

(51) Int. Cl.
*H04L 9/08* (2006.01)

(52) U.S. Cl.
CPC .................................. *H04L 9/0852* (2013.01)

(58) Field of Classification Search
CPC ..................................................... H04L 9/0852
See application file for complete search history.

(56) References Cited

U.S. PATENT DOCUMENTS

2013/0251145 A1 9/2013 Lowans et al.
2021/0044433 A1 2/2021 Hay et al.
2021/0111892 A1* 4/2021 Vahldiek-Oberwagner ................. G06F 21/57
2023/0188335 A1 6/2023 Lamas Linares et al.
2024/0072996 A1 2/2024 Webb et al.

FOREIGN PATENT DOCUMENTS

WO 2023002148 A1 1/2023

OTHER PUBLICATIONS

Bassi R., et al., "Quantum Key Distribution with Trusted Relay using an ETSI-compliant Software-Defined Controller", 2023 19th International Conference on the Design of Reliable Communication Networks (DRCN), Apr. 17-20, 2023, 7 Pages.
Chakrabarti S., et al., "Intel® SGX Enabled Key Manager Service with OpenStack Barbican", ArXiv, Dec. 20, 2017, pp. 1-28.
Kanzari H., et al., "Towards Management of Chains of Trust for Multi-Clouds with Intel SGX", Orange Labs, Jul. 6, 2016, 4 Pages.
Park M., et al., "An SGX-Based Key Management Framework for Data Centric Networking", IEEE Access, Mar. 4, 2020, vol. 8, pp. 45198-45210.

* cited by examiner

*Primary Examiner* — Baotran N To
(74) *Attorney, Agent, or Firm* — Edell, Shapiro & Finnan, LLC

(57) ABSTRACT

An embodiment provides a secure chain of key management servers (KMS) for distribution of keys via point-to-point quantum key distribution (QKD) links. A protocol initializes a link between nodes with enclaves hosting key management servers (KMS) and performs chain attestation to validate all nodes in the chain. Once validated, a QKD protocol can run as usual with certainty that keys are stored securely.

20 Claims, 7 Drawing Sheets

QUANTUM KEY DISTRIBUTION OVER A NETWORK USING SECURE ENCLAVES

TECHNICAL FIELD

The present disclosure relates to communication systems.

BACKGROUND

Quantum key distribution (QKD) networks are limited by a distance a quantum signal can be transmitted. To overcome the distance limitation, an approach uses trusted node relays (referred to as key management servers (KMS)) to relay key material on a hop-by-hop basis. However, this approach provides several disadvantages, including: the trusted nodes need to store the key material securely; keys must be erased after forwarding; memory should not have any backdoors; and security of the servers is crucial to protecting keys (since key security is lost when any single server is compromised). The security aspect is a significant weakness in distributed KMS systems, since a single compromised server anywhere in a chain can completely reveal all keys sent via QKD links.

DESCRIPTION OF EXAMPLE EMBODIMENTS

Overview

An embodiment provides a secure chain of key management servers (KMS) for distribution of keys via point-to-point quantum key distribution (QKD) links. A protocol initializes a link between nodes with enclaves hosting KMS and performs chain attestation to validate all nodes in the chain. Once validated, a QKD protocol can run as usual with certainty that keys are stored securely.

Example Embodiments

Quantum key distribution (QKD) networks are limited by a distance a quantum signal can be transmitted. Since QKD is distance limited, trusted nodes may be needed to scale QKD networks to many nodes. These nodes need to securely and reliably store keys.

An embodiment utilizes a secure chain of key management servers (KMS) for distribution of keys via point-to-point quantum key distribution (QKD) links. A protocol initializes a link between node (or KMS) enclaves, and performs chain attestation to validate all nodes in the chain. The use of secure enclaves provides security, even if a host server is compromised. Once the nodes are validated, a QKD protocol can run as usual with certainty that the keys are stored securely.

Each key management server (KMS) runs inside of a secure enclave. The KMS handles management of cryptographic or other keys (e.g., generation, exchange, storage, use, destruction, and/or replacement of keys). An enclave refers to a secure and isolated area within a computer system memory where sensitive computations can be performed. The enclave provides a protected environment where data and code are shielded from unauthorized access or tampering, typically using hardware-based security features. Enclaves are used to safeguard critical operations such as encryption, decryption, and authentication within applications. In other words, an enclave provides a restricted runtime environment that protects a running KMS from external tampering or observation, even if the host server is compromised. Memory is encrypted, and information stored in enclave memory is irretrievable after the enclave is terminated. Storage is protected through encryption keys stored in hardware and only accessible by the enclave. Enclaves can provide cryptographically secure attestations of their secure state. In an embodiment, these enclaves are leveraged to build a system that allows securely chaining a series of KMS running inside secure enclaves, and to provide a series of chained attestations to an end key consumer proving that all KMS in the chain are in a secure state.

The secure enclave implementation of a present embodiment provides features to secure an individual key management server (KMS) (e.g., encrypted memory, secure storage, hardware key storage, etc.). Further, a secure connection is established between KMS instances and ensures that these instances are running inside secure enclaves. This enables the end consumer of a key to verify that a key was delivered through a chain of KMS servers running inside secure enclaves.

Figure 1:
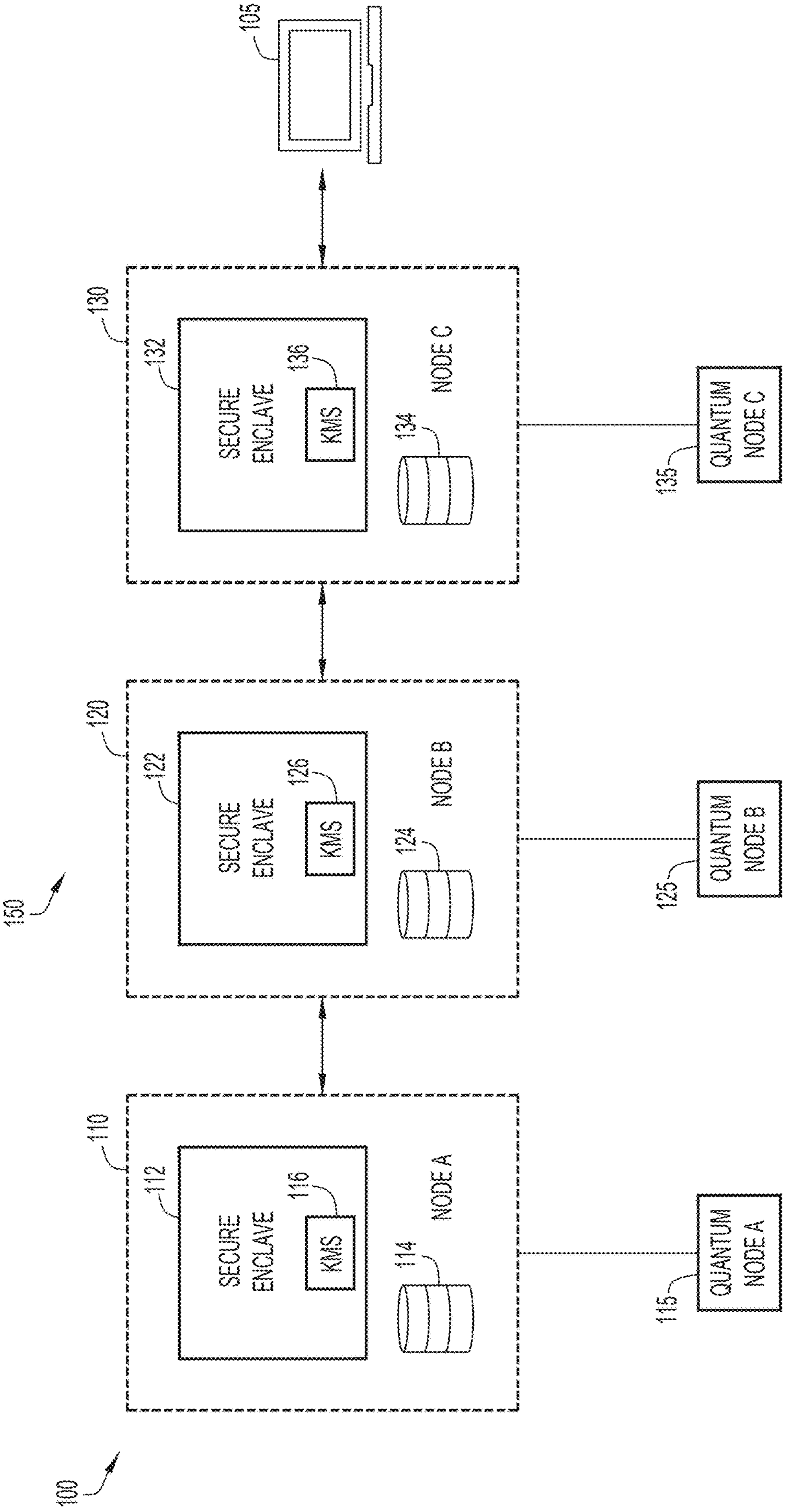
FIG. 1 is a block diagram of an example communication environment in which quantum key distribution (QKD) may be implemented using secure enclaves, according to an example embodiment.

FIG. 1 illustrates an example communication environment 100 in which quantum key distribution (QKD) may be implemented using secure enclaves, according to an example embodiment. Initially, communication environment 100 includes one or more client or user devices 105, and a chain or series of network nodes 150. By way of example, the chain of network nodes includes a network node 110 (e.g., Node A as viewed in FIG. 1), a network node 120 (e.g., Node B as viewed in FIG. 1), and a network node 130 (e.g., Node C as viewed in FIG. 1), but may include any quantity of network nodes. Each network node 110, 120, 130 is associated with a corresponding quantum node 115 (e.g., Quantum Node A as viewed in FIG. 1), quantum node 125 (e.g., Quantum Node B as viewed in FIG. 1), and quantum node 135 (e.g., Quantum Node C as viewed in FIG. 1) for quantum communications (e.g., via quantum link 210 (FIG. 2)) and performing any conventional or QKD protocol (e.g., QKD nodes, etc.).

Network node 110 (e.g., Node A as viewed in FIG. 1) includes a secure enclave 112, a secure storage device 114, and a key management server (KMS) 116. The KMS may be implemented by any conventional or other key management server, service, or system, and preferably runs inside of secure enclave 112. The KMS handles management of cryptographic or other keys (e.g., generation, exchange, storage, use, destruction, and/or replacement of keys). The secure enclave may be implemented by any conventional or other enclave or secure computer environment. An enclave refers to a secure and isolated area within a computer system memory where sensitive computations can be performed. The enclave provides a protected environment where data and code are shielded from unauthorized access or tampering, typically using hardware-based security features. Enclaves are used to safeguard critical operations such as encryption, decryption, and authentication within applications. In other words, an enclave provides a restricted runtime environment that protects a running KMS from external tampering or observation, even if the host server is compromised. Storage or memory device 114 is encrypted, and information stored in enclave memory is irretrievable after the enclave is terminated. The storage device may be implemented by any conventional or other storage or memory device. The memory device is protected through encryption keys stored in hardware and only accessible by the enclave. Enclaves can provide cryptographically secure attestations of their secure state. The attestations may include any information verifying or indicating a security status of the enclave (or (KMS)) (e.g., cryptographic measurements of enclave code and data, a digital signature from a trusted entity, etc.).

Further, network node 120 (e.g., Node B as viewed in FIG. 1) includes a secure enclave 122, a secure storage device 124, and a key management server (KMS) 126. KMS 126 is substantially similar to KMS 116 described above, and may be implemented by any conventional or other key management server, service, or system. KMS 126 preferably runs inside of secure enclave 122. Secure enclave 122 is substantially similar to secure enclave 112 described above, and may be implemented by any conventional or other enclave or secure computer environment. Storage or memory device 124 is encrypted, and information stored in enclave memory is irretrievable after the enclave is terminated. Storage device 124 is substantially similar to storage device 114 described above, and may be implemented by any conventional or other storage or memory device.

In addition, network node 130 (e.g., Node C as viewed in FIG. 1) includes a secure enclave 132, a secure storage device 134, and a key management server (KMS) 136. KMS 136 is substantially similar to KMS 116, 126 described above, and may be implemented by any conventional or other key management server, service, or system. KMS 136 preferably runs inside of secure enclave 132. Secure enclave 132 is substantially similar to secure enclaves 112, 122 described above, and may be implemented by any conventional or other enclave or secure computer environment. Storage or memory device 134 is encrypted, and information stored in enclave memory is irretrievable after the enclave is terminated. Storage device 134 is substantially similar to storage devices 114, 124 described above, and may be implemented by any conventional or other storage or memory device.

Initially, secure links are established between a chain of network nodes 110, 120, 130 as described below. User device 105 may request verification of the chain for receiving one or more keys. For example, user device 105 may send a verification request to network node 130. Network node 130 forwards an attestation to subsequent network node 120. The attestation from network node 130 indicates a security status of network node 130 (e.g., key management server (KMS) 136 is executing within secure enclave 132, etc.). Network node 120 encrypts the attestation from network node 130, and sends an attestation from network node 120 (including the encrypted attestation of network node 130) to network node 110. The attestation from network node 120 indicates a security status of network node 120 (e.g., KMS 126 is executing within secure enclave 122, etc.). Network node 110 encrypts the attestation from network node 120, and sends an attestation of network node 110 (including the encrypted attestation from network node 120 which includes the attestation from network node 130) to user device 105. The attestation from network node 110 indicates a security status of network node 110 (e.g., KMS 116 is executing within secure enclave 112, etc.).

User device 105 may authenticate the attestations and verify a secure state of network nodes 110, 120, 130 (e.g., key management servers (KMS) 116, 126, 136 are within corresponding secure enclaves 112, 122, 132). Once the chain of network nodes is verified, quantum nodes 115, 125, 135 may implement a quantum key distribution (QKD) protocol using the KMS within the enclaves.

Figure 2:
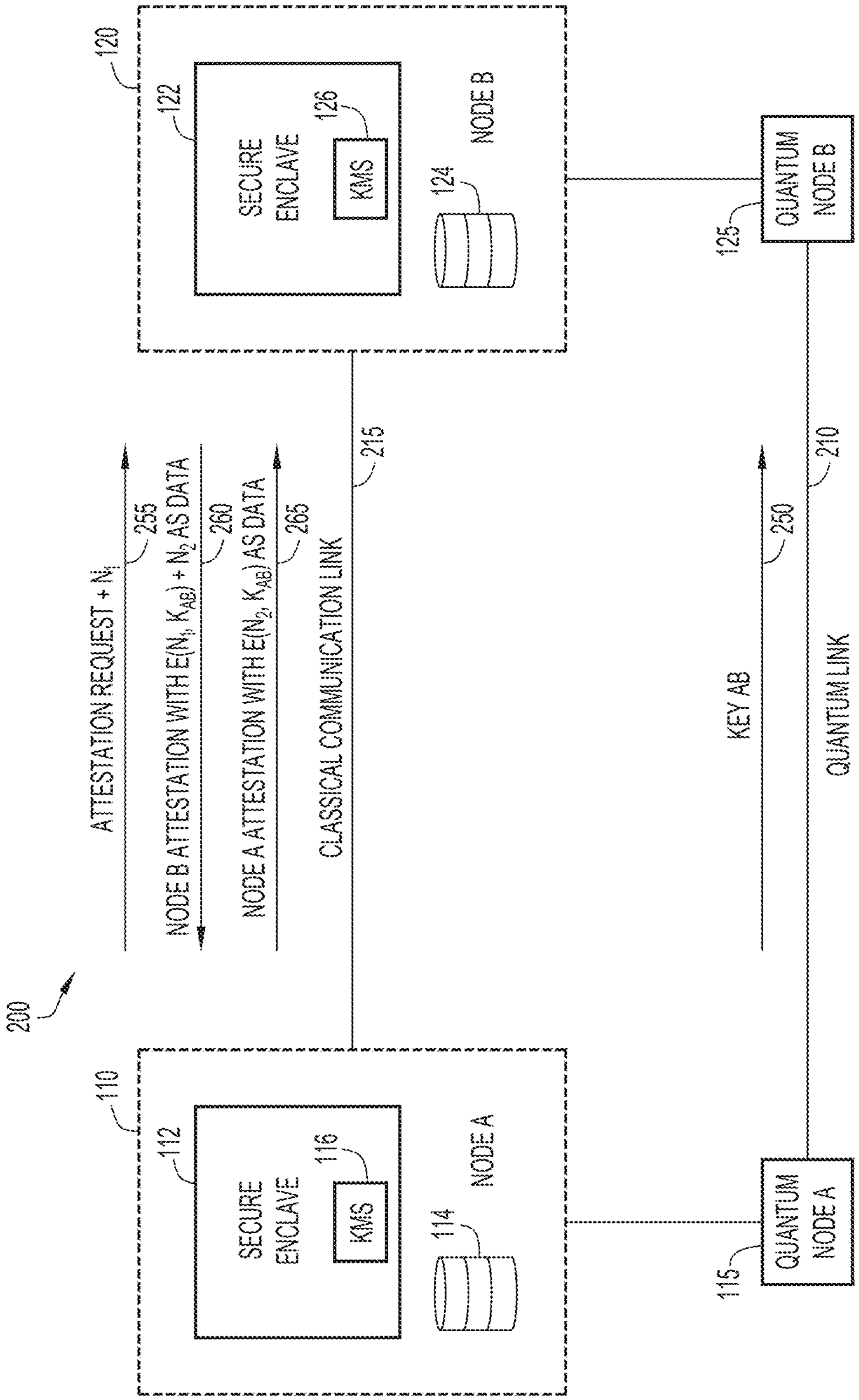
FIG. 2 illustrates a flow diagram for establishing a link between key management servers (KMS) within secure enclaves, according to an example embodiment.

With continued reference to FIG. 1, FIG. 2 illustrates a flow diagram of a method 200 for establishing a link between key management servers (KMS) within secure enclaves, according to an example embodiment. Initially, network nodes 110, 120 are substantially similar to the corresponding network nodes described above. By way of example, network node 110 may serve as an initiating node for establishing the link with a target node, while network node 120 may serve as the target node for the link with network node 110. However, the link may be established between any network nodes (or KMS) in substantially the same manner described below.

In order to establish a trusted connection between key management servers (KMS) 116, 126 of network nodes 110, 120, a shared secret key (e.g., Key $K_{AB}$ as viewed in FIG. 2) is transferred from quantum node 115 (e.g., Quantum Node A as viewed in FIG. 2, and associated with network node 110) to quantum node 125 (e.g., Quantum Node B as viewed in FIG. 2, and associated with network node 120) over a quantum (e.g., quantum key distribution (QKD)) link 210 between these quantum nodes at flow 250. The key is preferably a quantum key, but may be any cryptographic key. The terms 'shared secret key', 'shared key', and 'key' can be used herein interchangeably. The shared key is provided from quantum nodes 115, 125 to associated network nodes 110, 120.

Initiating network node 110 (e.g., Node A as viewed in FIG. 2) sends an initiation or attestation request along with a first nonce (e.g., $N_1$ as viewed in FIG. 2) to network node 120 at flow 255 over a classical communication link (or channel) 215 (e.g., a communication link or channel for digital or binary bits, etc.). The first nonce may be an arbitrary or random number that is used to prevent re-use of old communications for replay attacks. Network node 120 (e.g., Node B as viewed in FIG. 2) replies to the initiation request from network node 110 over classical communication link 215 with a cryptographic attestation that key management server (KMS) 126 (or corresponding software) is running in secure enclave 122 along with a second nonce (e.g., $N_2$ as viewed in FIG. 2) at flow 260. As referred to herein, a cryptographic attestation may also be referred to as an attestation. The attestation may include any information verifying or indicating a security status of secure enclave 122 (or KMS 126) (e.g., cryptographic measurements of enclave code and data, a digital signature from a trusted entity, etc.). The second nonce may be an arbitrary or random number that is used to prevent re-use of old communications for replay attacks. A data section of this attestation includes the first nonce ($N_1$) encrypted with the shared key ($K_{AB}$). This attestation proves that KMS 126 is running inside secure enclave 122, and that network node 120 is communicating over quantum link 210 since network node 120 has access to the shared key.

Network node 110 (e.g., Node A as viewed in FIG. 2) replies to network node 120 (e.g., Node B as viewed in FIG. 2) over classical communication link 215 with its own cryptographic attestation at flow 265. The attestation may include any information verifying or indicating a security status of secure enclave 112 (or key management server (KMS) 116) (e.g., cryptographic measurements of enclave code and data, a digital signature from a trusted entity, etc.). The data section of this attestation includes the second nonce ($N_2$) encrypted with the shared key ($K_{AB}$). This attestation proves that KMS 116 (or corresponding software) is running inside secure enclave 112, and that network node 110 is communicating over quantum link 210 since network node 110 has access to the shared key.

At the end of this exchange, network nodes 110, 120 know that the other node is secure, and is connected to quantum link 210. The above process may be repeated to establish a link between other network nodes and form a chain of trusted network nodes for key distribution.

Figure 3:
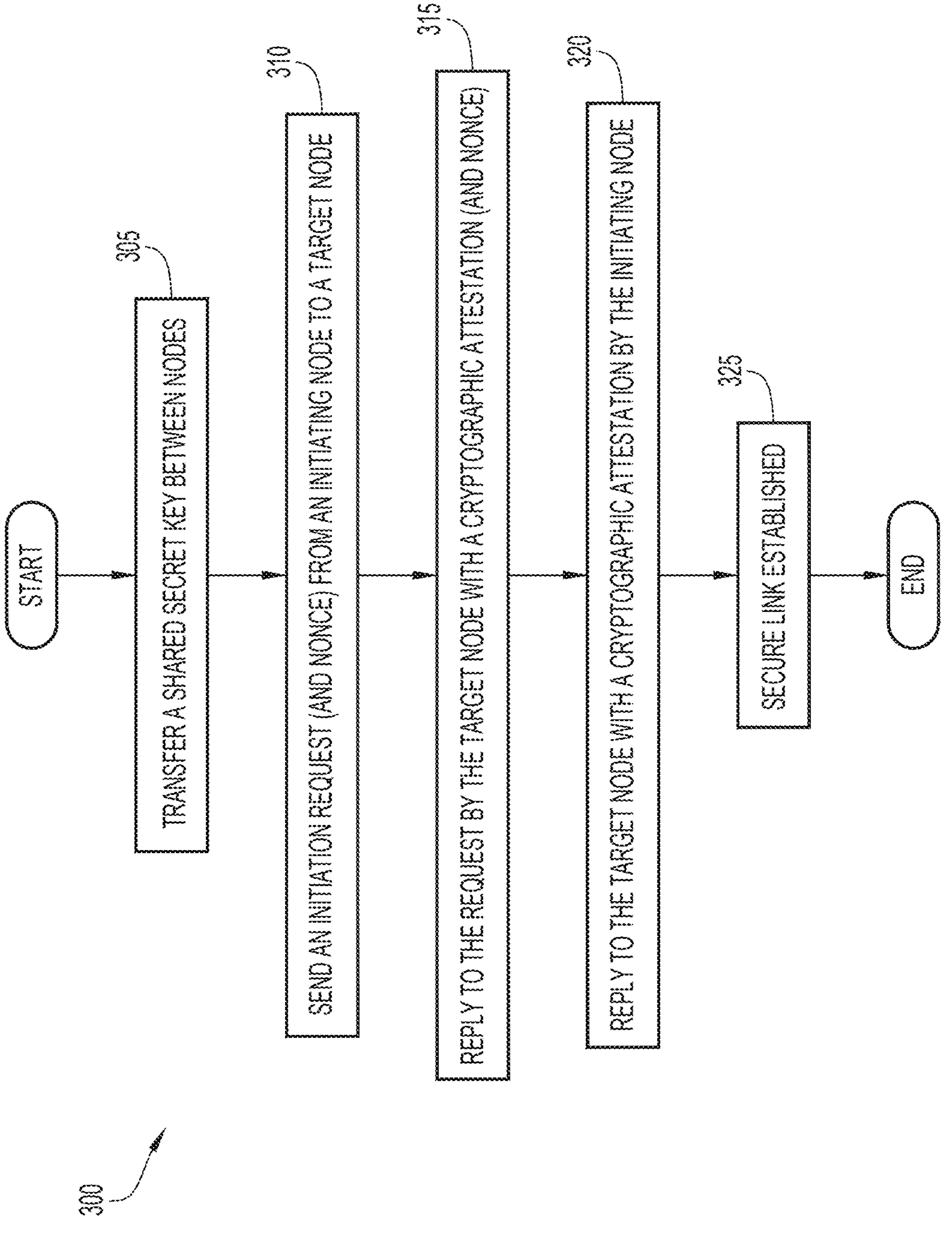
FIG. 3 illustrates a flowchart of a method for establishing a link between key management servers (KMS) within secure enclaves, according to an example embodiment.
Figure 4:
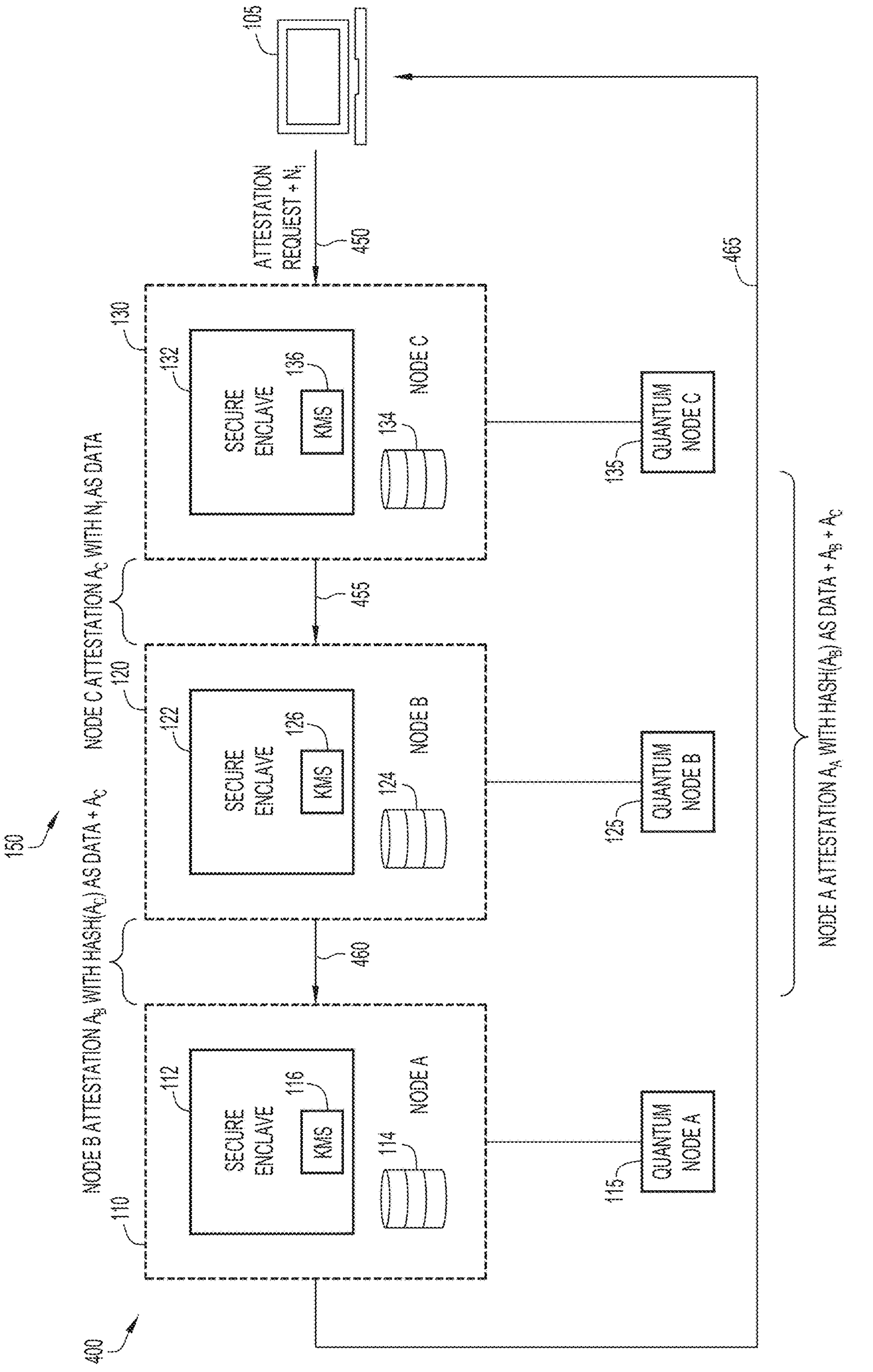
FIG. 4 illustrates a flow diagram for verifying a chain of key management servers (KMS) providing a key, according to an example embodiment.
Figure 5:
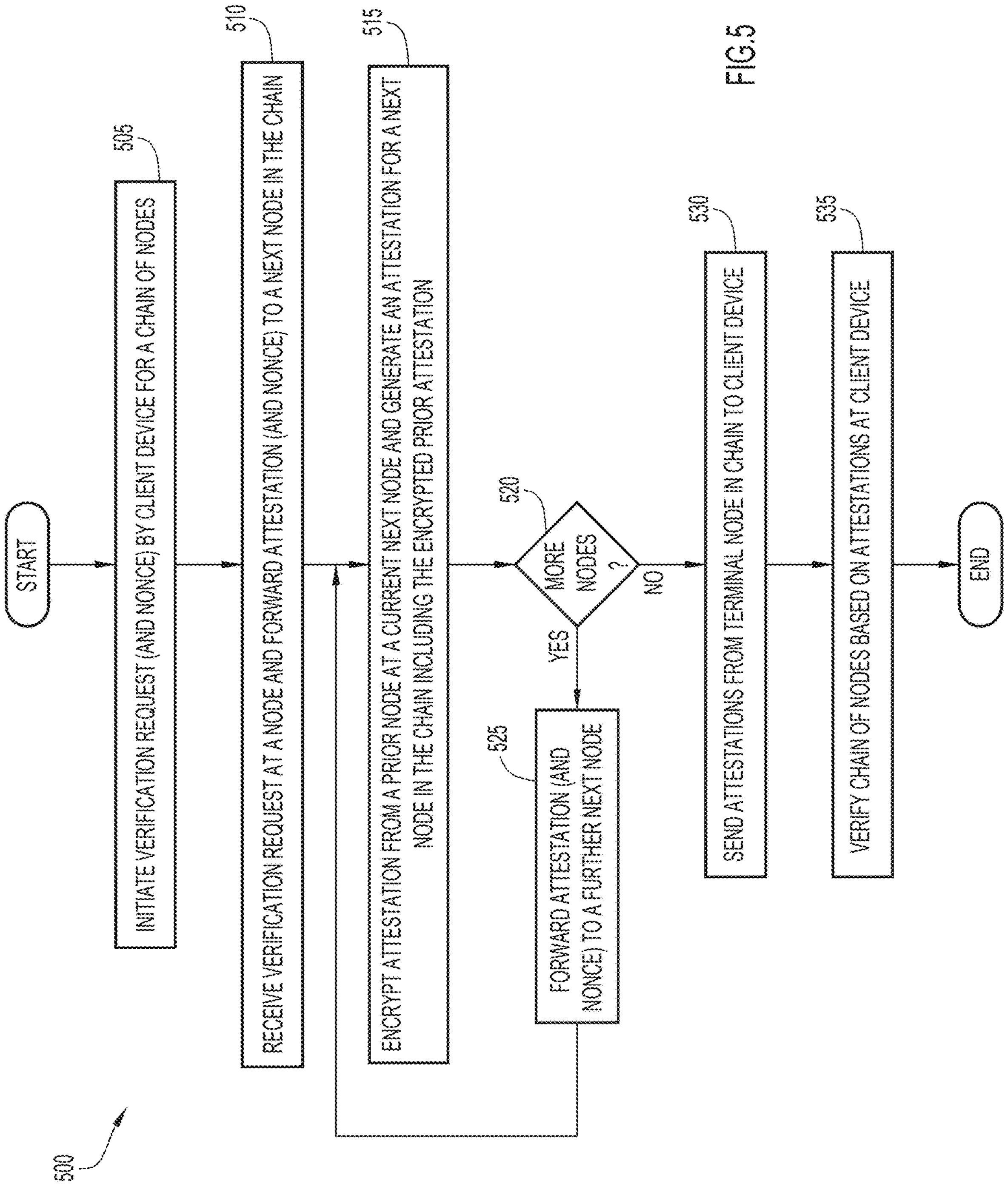
FIG. 5 illustrates a flowchart of a method for verifying a chain of key management servers (KMS) providing a key, according to an example embodiment.

With continued reference to FIGS. 1 and 2, FIG. 3 illustrates a flowchart of a method 300 for establishing a link between key management servers (KMS) within secure enclaves, according to an example embodiment. The link may be established between any network nodes (or KMS) in substantially the same manner described below, where any network node may initiate the link with any other network node.

Initially, a shared secret key is transferred from a quantum node (associated with an initiating network node initiating establishment of the link with a target network node) to a quantum node (associated with the target network node) over a quantum (e.g., quantum key distribution (QKD)) link between these quantum nodes at operation 305. The key is preferably a quantum key, but may be any cryptographic key. The shared key is provided from the quantum nodes to the associated initiating and target network nodes. The initiating and target network nodes are substantially similar to network nodes 110, 120, 130 described above, and each include a key management server (KMS), a secure enclave, and a secure storage device.

The initiating network node sends an initiation or attestation request along with a first nonce over a communication link or channel (e.g., a classical communication link or channel for digital or binary bits, etc.) to the target network node at operation 310. The first nonce may be an arbitrary or random number that is used to prevent re-use of old communications for replay attacks. The target network node (or corresponding enclave) produces a cryptographic attestation based on the attestation request. The cryptographic attestation indicates that a key management server (KMS) of the target network node (or corresponding software) is running in a secure enclave of the target network node. The attestation may include any information verifying or indicating a security status of the secure enclave (or KMS) of the target network node (e.g., cryptographic measurements of enclave code and data, a digital signature from a trusted entity, etc.). The target network node replies over the communication link to the initiation request from the initiating network node with the cryptographic attestation and a second nonce at operation 315. A data section of the attestation from the target network node includes the first nonce encrypted with the shared key. The attestation proves that the KMS of the target network node is running inside a secure enclave of the target network node, while the encrypted nonce is used to verify that the target network node is communicating over the quantum link since the target network node has access to the shared key.

The initiating network node (or corresponding enclave) receives the reply from the target network node and decrypts the encrypted nonce based on the shared key to verify that the target network node is communicating over the quantum link. The initiating network node further examines the attestation from the target network node (e.g., cryptographic measurements of enclave code and data, a digital signature from a trusted entity, etc.) to verify that the key management server (KMS) of the target network node is secure (or running in a secure enclave). The initiating network node also produces a cryptographic attestation indicating that a KMS of the initiating network node (or corresponding software) is running in a secure enclave of the initiating network node. The attestation may include any information verifying or indicating a security status of the enclave (or KMS) of the initiating network node (e.g., cryptographic measurements of enclave code and data, a digital signature from a trusted entity, etc.). The initiating network node replies to the target network node over the communication link with the cryptographic attestation at operation 320. A data section of this attestation includes the second nonce encrypted with the shared key. The attestation proves that the KMS of the initiating network node (or corresponding software) is running inside a secure enclave of the initiating network node, while the encrypted second nonce is used to verify that the initiating network node is communicating over the quantum link since the initiating network node has access to the shared key.

The target network node receives the reply from the initiating network node, and decrypts the encrypted second nonce based on the shared key to verify that the initiating network node is communicating over the quantum link. The target network node further evaluates the attestation from the initiating network node (e.g., cryptographic measurements of enclave code and data, a digital signature from a trusted entity, etc.) to verify that the key management server (KMS) of the initiating network node is secure (or running in a secure enclave).

At the end of the exchanges between the initiating and target network nodes, the secure link is established at operation 325 since these nodes know that the other node is secure and is connected to the quantum link (based on the attestations and encrypted nonces). The above process may be repeated to establish a link between other network nodes and form a chain of trusted network nodes for key distribution.

With continued reference to FIGS. 1-3, FIG. 4 illustrates a flow diagram of a method 400 for verifying a chain of key management servers (KMS) providing a key, according to an example embodiment. By way of example, method 400 is described with respect to an example chain of network nodes 150 including network nodes 110, 120, 130. However, method 400 may be applied to verify any quantity of network nodes in substantially the same manner described below.

Initially, network nodes 110, 120, 130 of the chain of network nodes 150 are substantially similar to the corresponding network nodes described above. By way of example, user device 105 requests authentication from network node 130 that sends authentication requests sequentially through remaining network nodes 120, 110 in the chain of network nodes 150. However, the user device may request authentication from any network node, while authentication requests may be sent to network nodes of the chain in any order or fashion to authenticate the chain of network nodes (or key management servers (KMS)) in substantially the same manner described below. Secure connections between the network nodes may be established in substantially the same manner described above (FIGS. 2 and 3).

Key consumers may need to verify that received keys have arrived through a sequence of enclave-secured key management servers (KMS). Client or user device 105 initiates or sends an authentication request over a classical communication link or channel (e.g., a communication link or channel for digital or binary bits, etc.) with a nonce (e.g., $N_1$ as viewed in FIG. 4) to network node 130 (e.g., Node C as viewed in FIG. 4) at flow 450. The nonce may be an arbitrary or random number that is used to prevent re-use of old communications for replay attacks. Network node 130 (e.g., via corresponding enclave 132 and/or key management server (KMS) 136) produces a cryptographic attestation. The cryptographic attestation indicates that KMS 136 of network node 130 (or corresponding software) is running in secure enclave 132. The attestation may include any information verifying or indicating a security status of secure enclave 132 (or KMS 136) (e.g., cryptographic measurements of enclave code and data, a digital signature from a trusted entity, etc.). KMS 136 incorporates the first nonce as data in its attestation and forwards this attestation over a classical communication link or channel (e.g., a communication link or channel for digital or binary bits, etc.) to network node 120 (e.g., Node B as viewed in FIG. 4) which is the next KMS in the chain at flow 455.

Subsequent network nodes (or key management servers (KMS)) in the chain encrypt the attestation from a previous network node (or previous KMS), and include the encrypted value in the data section of their attestation. By way of example, a subsequent network node (or KMS) in the chain may hash an attestation from a prior network node (or KMS) with a cryptographically secure hash, and include this hash value in the data section of their attestation. However, any conventional or other encryption techniques may be used.

Accordingly, network node 120 receives the attestation (including the nonce) from network node 130, and encrypts the attestation. Network node 120 (e.g., via corresponding secure enclave 122 and/or key management server (KMS) 126) further produces a cryptographic attestation. The cryptographic attestation for network node 120 indicates that KMS 126 of network node 120 (or corresponding software) is running in secure enclave 122. The attestation may include any information verifying or indicating a security status of secure enclave 122 (or KMS 126) (e.g., cryptographic measurements of enclave code and data, a digital signature from a trusted entity, etc.). KMS 126 incorporates the encrypted and unencrypted versions of the attestation from network node 130 as data in its attestation, and forwards this attestation over a classical communication link or channel (e.g., a communication link or channel for digital or binary bits, etc.) to network node 110 (e.g., Node A as viewed in FIG. 4) which is the next (and terminal or final) key management server (KMS) in the chain at flow 460.

Network node 110 receives the attestation (including the encrypted and unencrypted versions of the attestation from network node 130) from network node 120, and encrypts the attestation. Network node 110 (e.g., via corresponding secure enclave 112 and/or key management server (KMS) 116) further produces a cryptographic attestation. The cryptographic attestation for network node 110 indicates that KMS 116 of network node 110 (or corresponding software) is running in secure enclave 112. The attestation may include any information verifying or indicating a security status of secure enclave 112 (or KMS 116) (e.g., cryptographic measurements of enclave code and data, a digital signature from a trusted entity, etc.). KMS 116 incorporates the encrypted version of the attestation from network node 120 and the unencrypted attestations from network nodes 120, 130 as data in its attestation, and forwards this attestation over a classical communication link or channel (e.g., a communication link or channel for digital or binary bits, etc.) to user device 105 at flow 465.

User device 105 receives the attestation from network node 110 which includes nested attestations from network nodes 120, 130. For example, the attestation from network node 110 includes the attestation for secure enclave 112 (or key management server (KMS) 116) of network node 110 and the encrypted version of the attestation from network node 120. The attestation from network node 120, in turn, includes the attestation for secure enclave 122 (or KMS 126) and an encrypted version of the attestation from network node 130 which includes the attestation for secure enclave 132 (or KMS 136) and the nonce. In addition, the attestation from network node 110 includes unencrypted versions of the attestations from network nodes 120, 130. Thus, the attestation from network node 110 includes the attestations from other network nodes in the chain.

User device 105 verifies that all key management servers in the chain are secure based on the attestation from network node 110. For example, the user device may include or have access to the keys (or hashes) used to encrypt the attestations. The keys may be used to encrypt the unencrypted versions of the attestations in the attestation from network node 110 and compare the result to the encrypted versions within the attestation from network node 110 to verify the attestations of the network nodes. The attestations may further be evaluated to verify that the key management severs (KMS) of the network nodes are within secure enclaves, thereby indicating that the KMS are secure and a trusted entity for providing keys. Once the key management servers are verified, a quantum key distribution protocol (QKD) may be performed (e.g., by the network and quantum nodes) to securely distribute keys.

With continued reference to FIGS. 1-4, FIG. 5 illustrates a flowchart of a method 500 for verifying a chain of key management servers (KMS) providing a key, according to an example embodiment. A user device may request authentication from any network node, while authentication requests may be sent to network nodes of a chain in any order or fashion to authenticate the chain of network nodes (or KMS) in substantially the same manner described below.

Initially, key consumers may need to verify that received keys have arrived through a sequence of enclave-secured key management servers (KMS). A client or user device initiates or sends a verification or authentication request with a nonce over a communication link or channel (e.g., a classical communication link or channel for digital or binary bits, etc.) to a first network node of a chain of network nodes at operation 505. The network nodes may be substantially similar to the network nodes described above, with each network node including a key management server (KMS), a secure enclave, and a secure storage device. Secure connections between the network nodes may be established in substantially the same manner described above (FIGS. 2 and 3). The nonce may be an arbitrary or random number that is used to prevent re-use of old communications for replay attacks.

The first network node receives the verification request from the user device. The first network node (e.g., via a corresponding secure enclave and/or key management server (KMS)) produces a cryptographic attestation. The cryptographic attestation indicates that a KMS of the first network node (or corresponding software) is running in a secure enclave. The attestation may include any information verifying or indicating a security status of the secure enclave (or KMS) (e.g., cryptographic measurements of enclave code and data, a digital signature from a trusted entity, etc.). The KMS of the first network node incorporates the nonce as data in its attestation and forwards this attestation over a communication channel or link (e.g., a classical communication channel or link for digital or binary bits, etc.) to a next network node (or KMS) in the chain at operation 510.

Subsequent network nodes (or key management servers (KMS)) in the chain encrypt the attestation from a previous network node (or previous KMS), and include the encrypted value in the data section of their attestation. By way of example, a subsequent network node (or KMS) in the chain may hash an attestation from a prior network node (or KMS) with a cryptographically secure hash, and include this hash value in the data section of their attestation. However, any conventional or other encryption techniques may be used.

Accordingly, the next network node in the chain receives the attestation (including the nonce) from the first network node, and encrypts the attestation. The next network node (e.g., via a corresponding secure enclave and/or key management server (KMS)) further produces a cryptographic attestation. The cryptographic attestation for the next network node indicates that a KMS of the next network node (or corresponding software) is running in a secure enclave of the next network node. The attestation may include any information verifying or indicating a security status of the secure enclave (or KMS) (e.g., cryptographic measurements of enclave code and data, a digital signature from a trusted entity, etc.). The KMS of the next network node incorporates the encrypted and unencrypted versions of the attestation from the first network node as data in its attestation at operation 515.

When more network nodes are present in the chain as determined at operation 520, the next network node forwards the produced attestation over a communication link or channel (e.g., a classical communication link or channel for digital or binary bits, etc.) to a further next node (or key management server (KMS)) in the chain at operation 525. The above process repeats from operation 515 until a terminal or final network node in the chain is processed, thereby producing a nested series of attestations through the chain of network nodes as described above.

When the chain of network nodes has been processed as determined at operation 520, the terminal network node forwards the resulting attestation over a communication link or channel (e.g., a classical communication link or channel for digital or binary bits, etc.) to the user or client device at operation 530. The user device receives the attestation from the terminal network node which includes nested attestations from the network nodes in the chain as described above. For example, the attestation from the terminal network node includes nested attestations from the prior network nodes in the chain in substantially the same manner described above. Thus, the attestation from the terminal network node includes the attestations from the other network nodes in the chain.

The user device verifies that all key management servers (KMS) in the chain are secure based on the attestation from the terminal network node at operation 535. For example, the user device may include or have access to the keys (or hashes) used to encrypt the attestations. The keys may be used to encrypt the unencrypted versions of the attestations in the attestation from the terminal network node and compare the result to the encrypted versions within the attestation from the terminal network node to verify the attestations of the network nodes. The attestations may further be evaluated to verify that the KMS are within secure enclaves, thereby indicating that the KMS are secure and a trusted entity for providing keys. Once the key management servers are verified, a quantum key distribution protocol (QKD) may be performed (e.g., via the quantum and network nodes) to securely distribute (and enable users to obtain) keys. The verification may be performed prior to, or after, obtaining or receiving keys.

Figure 6:
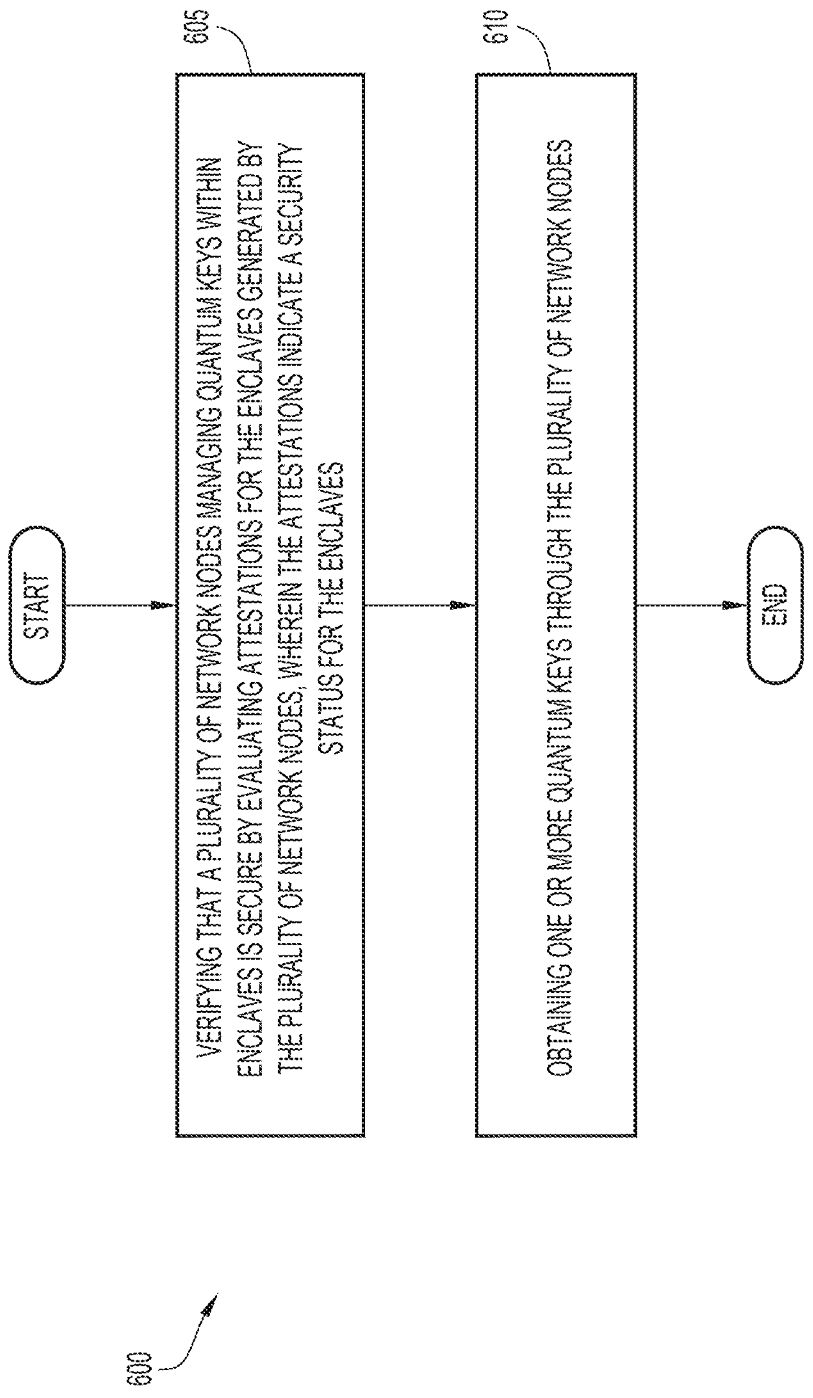
FIG. 6 illustrates a flowchart of a generalized method for quantum key distribution (QKD) using secure enclaves, according to an example embodiment.

FIG. 6 illustrates a flowchart of an example method 600 for quantum key distribution (QKD) using secure enclaves, according to an example embodiment. At operation 605, a plurality of network nodes managing quantum keys within enclaves is verified as secure by evaluating attestations for the enclaves generated by the plurality of network nodes, wherein the attestations indicate a security status for the enclaves. At operation 610, one or more quantum keys are obtained through the plurality of network nodes.

Figure 7:
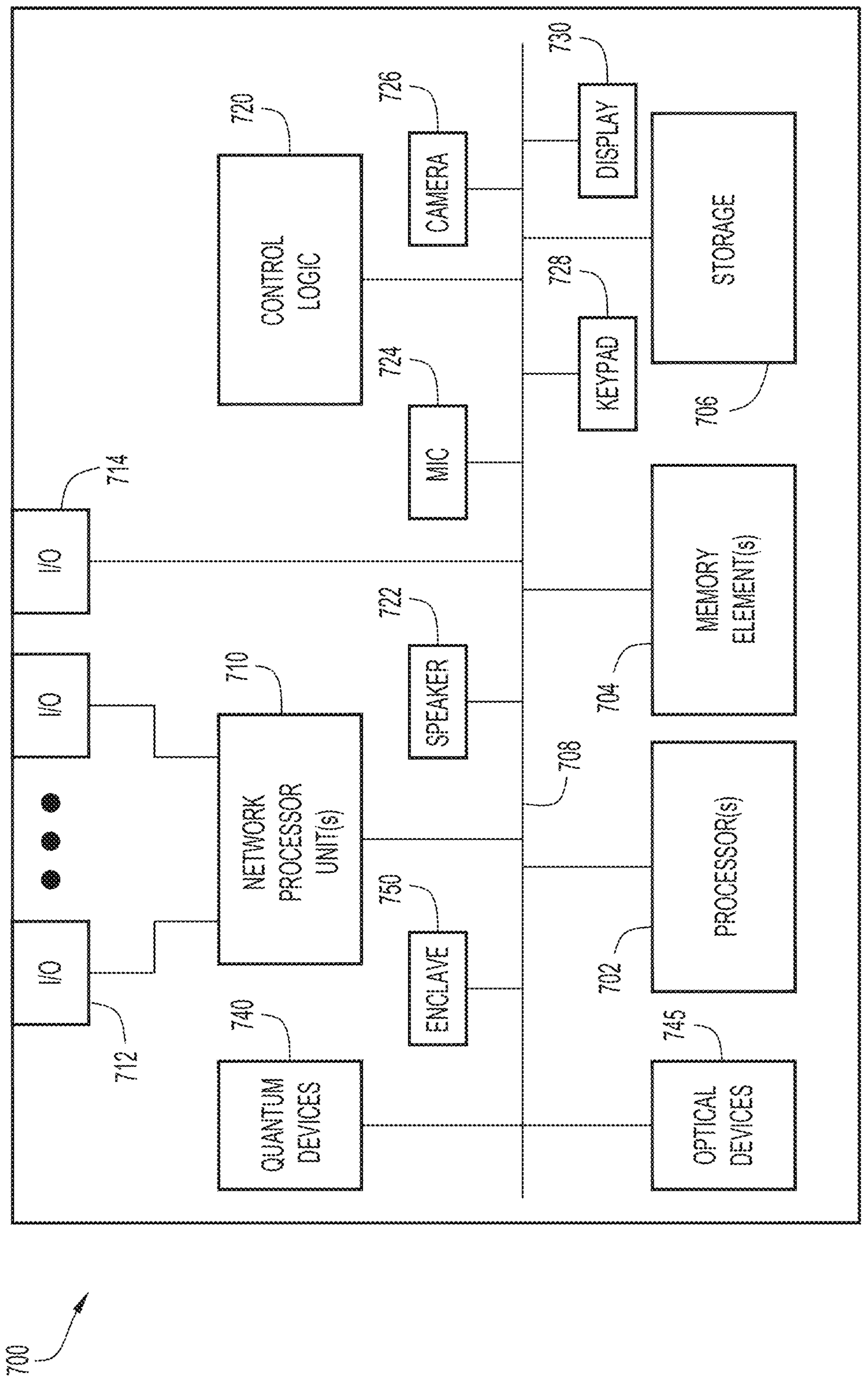
FIG. 7 illustrates a hardware block diagram of a computing device configured to perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus or system, such as computing device 700 or any combination of computing devices 700, may be configured as any device entity/entities (e.g., network nodes, computer devices, user devices, client devices, communication devices, network devices, processors, switching devices, network interfaces, quantum nodes, etc.) as discussed for the techniques depicted in connection with FIGS. 1-6 in order to perform operations of the various techniques discussed herein.

In at least one embodiment, computing device 700 may be any apparatus that may include one or more processor(s) 702, one or more memory element(s) 704, storage 706, a bus 708, one or more network processor unit(s) 710 interconnected with one or more network input/output (I/O) interface (s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interfaces 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., client device, network device, network nodes, processors, network interfaces, switching devices, quantum nodes, etc.), computing device 700 may further include, or be coupled to, a speaker 722 to convey sound, microphone or other sound sensing device 724, camera or image capture device 726, a keypad or keyboard 728 to enter information (e.g., alphanumeric information, etc.), a touch screen or other display 730, quantum devices 740, optical devices 745, and/or enclave (or other secure computing environment) 750. Enclave 750 may reside within memory element(s) 704 or storage 706. These items may be coupled to bus 708 or I/O interface(s) 714 to transfer data with other elements of computing device 700. Quantum devices 740 may include any conventional or other devices to perform the functions described herein (e.g., generating, transmitting, receiving, entangling, and/or processing quantum signals and/or keys), such as a quantum source, quantum transmitters and receivers, quantum channels, a source of randomness, lasers or other energy sources, quantum measuring devices, quantum logic or other gates or circuits, quantum memories, quantum processors, quantum buffers, etc. Optical devices 745 may include any conventional or other optical devices to perform the functions described herein (e.g., generating, transmitting, receiving, and/or processing classical or other optical signals), such as optical switches, optical transmitters and receivers, optical multiplexers or other switching devices, etc.

In various embodiments, control logic 720 can include instructions that, when executed, cause processor(s) 702 to perform operations, which can include, but not be limited to, providing overall control operations of computing device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, network devices, storage devices, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various network devices, storage devices, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory elements 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' or 'frame' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: verifying that a plurality of network nodes managing quantum keys within enclaves is secure by evaluating attestations for the enclaves generated by the plurality of network nodes, wherein the attestations indicate a security status for the enclaves; and obtaining one or more quantum keys through the plurality of network nodes.

In one example, the plurality of network nodes includes key management servers executing within the enclaves to manage the quantum keys.

In one example, obtaining one or more quantum keys comprises obtaining the one or more quantum keys using a quantum key distribution protocol.

In one example, the method further comprises: establishing a link between first and second nodes of the plurality of network nodes by sharing a quantum key between quantum nodes associated with the first and second nodes; and exchanging corresponding attestations between the first and second nodes including data encrypted with the quantum key to indicate the link is secure.

In one example, the quantum key is shared over a quantum link, and the corresponding attestations are exchanged over a classical communication link.

In one example, subsequent nodes within the plurality of network nodes generate an attestation including an encrypted attestation of a prior node.

In one example, verifying comprises: receiving an attestation from a terminal node of the plurality of network nodes including attestations for enclaves of remaining network nodes; and evaluating the attestations from the terminal node for the enclaves of the plurality of network nodes to verify the plurality of network nodes.

In another form, an apparatus is provided. The apparatus comprises a plurality of network nodes managing quantum keys within enclaves, and a network interface coupled to one or more processors. The one or more processors are configured to: verify that the plurality of network nodes is secure by evaluating attestations for the enclaves generated by the plurality of network nodes, wherein the attestations indicate a security status for the enclaves; and obtain one or more quantum keys through the plurality of network nodes.

In another form, one or more non-transitory computer readable storage media are provided. The one or more non-transitory computer readable storage media are encoded with processing instructions that, when executed by one or more processors, cause the one or more processors to: verify that a plurality of network nodes managing quantum keys within enclaves is secure by evaluating attestations for the enclaves generated by the plurality of network nodes, wherein the attestations indicate a security status for the enclaves; and obtain one or more quantum keys through the plurality of network nodes.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

establishing a link between adjacent network nodes of a plurality of network nodes of a chain from a client device by sharing a quantum key between quantum nodes associated with the adjacent network nodes, wherein each of the plurality of network nodes includes a key management server within a secure enclave to manage keys for distribution of one or more quantum keys;

generating, by the plurality of network nodes of the chain, attestations indicating a security status for corresponding secure enclaves;

sending the attestations over the chain to the client device, wherein an attestation of an intermediate network node along the chain includes an encrypted attestation of a prior network node along the chain;

verifying at the client device that the plurality of network nodes of the chain is secure by evaluating the attestations from the chain for the corresponding secure enclaves; and obtaining by the client device the one or more quantum keys through the plurality of network nodes of the chain.

2. The method of claim 1, wherein the attestations include a nonce.

3. The method of claim 1, wherein obtaining the one or more quantum keys comprises:

obtaining the one or more quantum keys using a quantum key distribution protocol.

4. The method of claim 1, further comprising:

exchanging corresponding attestations between the adjacent network nodes including data encrypted with the quantum key to indicate the link is secure.

5. The method of claim 4, wherein the quantum key is shared over a quantum link, and the corresponding attestations are exchanged over a classical communication link.

6. The method of claim 1, wherein verifying comprises decrypting encrypted attestations from the chain.

7. The method of claim 1, wherein verifying comprises:

receiving the attestations from a terminal node of the chain.

8. An apparatus comprising:

a plurality of network nodes each including a key management server within a secure enclave to manage keys for distribution of one or more quantum keys; and a network interface coupled to one or more processors of the plurality of network nodes, wherein the one or more processors are configured to perform operations including:

establishing a link between adjacent network nodes of the plurality of network nodes of a chain from a client device by sharing a quantum key between quantum nodes associated with the adjacent network nodes;

generating attestations indicating a security status for corresponding secure enclaves;

sending the attestations over the chain to the client device, wherein an attestation of an intermediate network node along the chain includes an encrypted attestation of a prior network node along the chain;

and obtaining for the client device the one or more quantum keys through the plurality of network nodes of the chain in response to verification of the plurality of network nodes of the chain as secure by the client device evaluating the attestations from the chain for the corresponding secure enclaves.

9. The apparatus of claim 8, wherein the attestations include a nonce.

10. The apparatus of claim 8, wherein obtaining the one or more quantum keys comprises:

obtaining the one or more quantum keys using a quantum key distribution protocol.

11. The apparatus of claim 8, wherein the one or more processors are configured to perform further operations including:

exchanging corresponding attestations between the adjacent network nodes including data encrypted with the quantum key to indicate the link is secure.

12. The apparatus of claim 11, wherein the quantum key is shared over a quantum link, and the corresponding attestations are exchanged over a classical communication link.

13. The apparatus of claim 8, wherein verifying comprises:

receiving the attestations from a terminal node of the chain.

14. One or more non-transitory computer readable storage media encoded with processing instructions that, when executed by one or more processors, cause the one or more processors to perform operations including:

establishing a link between adjacent network nodes of a plurality of network nodes of a chain from a client device by sharing a quantum key between quantum nodes associated with the adjacent network nodes, wherein each of the plurality of network nodes includes a key management server within a secure enclave to manage keys for distribution of one or more quantum keys;

generating attestations indicating a security status for corresponding secure enclaves;

sending the attestations over the chain to the client device, wherein an attestation of an intermediate network node along the chain includes an encrypted attestation of a prior network node along the chain;

and obtaining for the client device the one or more quantum keys through the plurality of network nodes of the chain in response to verification of the plurality of network nodes of the chain as secure by the client device evaluating the attestations from the chain for the corresponding secure enclaves.

15. The one or more non-transitory computer readable storage media of claim 14, wherein the attestations include a nonce.

16. The one or more non-transitory computer readable storage media of claim 14, wherein obtaining the one or more quantum keys comprises:

obtaining the one or more quantum keys using a quantum key distribution protocol.

17. The one or more non-transitory computer readable storage media of claim 14, wherein the processing instructions cause the one or more processors to perform further operations including:

exchanging corresponding attestations between the adjacent network nodes including data encrypted with the quantum key to indicate the link is secure.

18. The one or more non-transitory computer readable storage media of claim 17, wherein the quantum key is shared over a quantum link, and the corresponding attestations are exchanged over a classical communication link.

19. The one or more non-transitory computer readable storage media of claim 14, wherein verifying comprises decrypting encrypted attestations from the chain.

20. The one or more non-transitory computer readable storage media of claim 14, wherein verifying comprises:

receiving the attestations from a terminal node of the chain.

* * * * *